(12) United States Patent
Sato et al.

(10) Patent No.: US 6,818,098 B2
(45) Date of Patent: Nov. 16, 2004

(54) ULTRASONIC BONDING MACHINE

(75) Inventors: Shigeru Sato, Fukuoka-ken (JP); Seiya Nakai, Fukuoka-ken (JP)

(73) Assignee: Ultex Corporation, Fukuoka-ken (JP)

( * ) Notice: Subject to any disclaimer, the term of this patent is extended or adjusted under 35 U.S.C. 154(b) by 0 days.

(21) Appl. No.: 10/676,150

(22) Filed: Oct. 2, 2003

(65) Prior Publication Data

US 2004/0065415 A1 Apr. 8, 2004

(30) Foreign Application Priority Data

Oct. 3, 2002 (JP) ........................................ 2002-291583
Nov. 15, 2002 (JP) ........................................ 2002-331493

(51) Int. Cl.[7] .............................................. B29C 65/08
(52) U.S. Cl. ................... 156/580.2; 156/73.4; 156/502; 156/580.1
(58) Field of Search ............................. 156/73.1, 73.4, 156/157, 308.2, 502, 544, 580.1, 580.2

(56) References Cited

U.S. PATENT DOCUMENTS

| | | | | |
|---|---|---|---|---|
| 4,935,081 A | * | 6/1990 | Becking | 156/157 |
| 5,085,719 A | * | 2/1992 | Eck | 156/73.4 |
| 5,207,854 A | * | 5/1993 | Becking | 156/350 |
| 5,304,266 A | * | 4/1994 | Becking | 156/64 |

* cited by examiner

*Primary Examiner*—James Sells
(74) *Attorney, Agent, or Firm*—Takeuchi & Takeuchi

(57) ABSTRACT

After the fixing of an angle indexing body to a holder by fixtures is canceled by loosening the fixtures, a resonator is turned by operating the angle indexing body with an axis in a vibration transmission direction as the center of rotation, a bonding work face is replaced by another bonding work face, and the angle indexing body is fixed to the holder by the fixtures so that the new bonding work face becomes parallel to the top face of a mounting table. Therefore, the replacement of the bonding work face can be simplified. Since overlapped workpieces are sandwiched between the bonding work face of the resonator and the mounting table, the mounting table makes a follow-up movement by a bearing composed of a spherical projection portion and a spherical depression portion to ensure that the bonding work face becomes parallel to the top face of the mounting table, thereby making it possible to optimize the position of the sandwiched workpieces.

9 Claims, 11 Drawing Sheets

ULTRASONIC BONDING MACHINE

BACKGROUND OF THE INVENTION

1. Field of the Invention

The present invention relates to an ultrasonic bonding machine for bonding together overlapped portions of a plurality of workpieces.

2. Description of the Prior Art

U.S. Pat. No. 2,934,602 discloses a resonator support apparatus. As for the resonator support structure of this apparatus, when a nut is fastened, a wedge outer cylinder secures a resonator by shrinking force from a holder and the wedge function of a wedge inner cylinder and the wedge outer cylinder to achieve parallelism between the bonding work face to be contacted to a workpiece of the resonator and the face in contact with the workpiece of a mounting table. When the bonding work face in contact with the workpiece of the resonator is gradually worn away by repeating the processing operation of the ultrasonic bonding machine or when the bonding work face is damaged by fine foreign matter sandwiched between the workpiece and the bonding work face, a bonding failure or the damage of the workpiece occurs. To prevent this, when the bonding work face is damaged, the resonator may be exchanged with a new one, which is not economical. Therefore, one resonator is provided with a plurality of bonding work faces in a circumferential direction with an axis in a vibration transmission direction as the center so that when one bonding work face is damaged, another bonding work face can be used.

U.S. Pat. No. 2,712,592 discloses a mounting apparatus. In this mounting apparatus, while a mounting table is assembled by a bearing which is constructed by mating between a spherical projection portion and a spherical depression portion, and pressure air is supplied between the mating faces of the spherical projection portion and the spherical depression portion to form a lubricant air layer, the bonding work face of a bonding tool is pressed against the top face of the mounting table to have the mounting table follow the bonding work face of the bonding tool, the pressure air of the lubricant air layer is absorbed between the mating faces of the spherical projection portion and the spherical depression portion, and the mounting table which has made a follow-up movement is fixed to the base to maintain its position.

U.S. Pat. No. 2,841,334 discloses a bonding tool provided with a follow-up unit similar to the mounting apparatus of the above U.S. Pat. No. 2,712,592.

Since the resonator support apparatus disclosed by U.S. Pat. No. 2,934,602 has a structure that the resonator is fixed to the holder, to replace one bonding work face by another bonding work face, the fixing of the resonator to the holder is canceled by loosening a nut, and the resonator is turned in a circumferential direction with an axis in a vibration transmission direction as the center of rotation to achieve parallelism between the new bonding work face and the face to be contacted to the workpiece of the mounting table. Thereafter, the resonator must be fixed to the holder by fastening the nut again. When fastening force for fastening the nut again changes, the vibration balance of the resonator varies, whereby it takes a lot of labor and time to switch from one bonding work face to another bonding work face.

Since the mounting apparatus disclosed by U.S. Pat. No. 2,712,592 has a structure that pressure air is supplied between the mating faces of the spherical projection portion and the spherical depression portion or absorbed between the mating faces of the spherical projection portion and the spherical depression portion through the same passage, a valve for connecting the air supply system and air suction system to the same passage or disconnecting the systems from the passage needs to have functions for both increased pressure and reduced pressure, thereby making the structure of the valve complex. In addition, as this mounting apparatus has a structure that the mounting table which has made a follow-up movement is fixed to the base by the suction of air, when vibration such as ultrasonic vibration is transmitted from the bonding tool to the mounting table during processing, suction force between the mating faces of the spherical projection portion and the spherical depression portion lowers, and the position of the mounting table which has made a follow-up movement slightly deviates from its right position, thereby exerting a bad influence on processing.

Since what is disclosed by U.S. Pat. No. 2,841,334 has a structure that as the bonding tool is provided with a follow-up unit, a problem occurs that when the bonding tool is used as a tool for bonding a workpiece with ultrasonic vibration, imbalance of mass caused by the follow-up unit exerts a bad influence on ultrasonic vibration in the bonding tool, in addition to the problem of the mounting apparatus disclosed by the above U.S. Pat. No. 2,712,592. Therefore, this apparatus can hardly be employed.

It is an object of the present invention to facilitate the replacement of a bonding work face used in an ultrasonic bonding machine. It is another object of the present invention to optimize the maintenance of the position of a mounting table which has made a follow-up movement so that the top face of the mounting table becomes parallel to the bonding work face of the resonator.

SUMMARY OF THE INVENTION

In the ultrasonic bonding machine of the present invention, a resonator support device comprises a holder connected to a pressure unit, rotation support units and an angle indexing unit, the rotation support units turn the resonator with an axis in a vibration transmission direction as the center of rotation, and the angle indexing unit is fixed at an indexing angle in a circumferential direction with the axis in the vibration transmission direction of a plurality of bonding work faces of the resonator turned by the above rotation support units as the center, thereby making it possible to carry out the replacement of the used bonding work face easily. Since the angle indexing unit comprises an angle indexing body mounted to the holder in such a manner that it can move in a direction perpendicular to the axis in the vibration transmission direction, stoppers attached to the angle indexing body, and stopper portions to be mated with the stoppers at an indexing angle of the plurality of bonding work faces and formed in the rotation support unit, angle indexing can be carried out manually. When the angle indexing unit comprises an operation body rotatably mounted to the holder, a cam fixed to the operation body and a guide for slidably mating the angle indexing body with the holder, an angle indexing operation becomes easy. When the angle indexing unit comprises a step motor mounted to the holder and a train of gears for transmitting the revolution of the step motor to the rotation support unit, angle indexing can be carried out electrically. When the train of gears consists of a small-diameter gear connected to the step-motor and a large-diameter gear connected to the rotation support unit, electric angle indexing becomes more accurate. The mounting unit of the ultrasonic bonding machine of the present invention comprises a base, mounting table, bearing which consists of a spherical projection portion and a spherical depression portion and which mounts the mounting table to the base in such a manner that the mounting table can make a follow-up movement, air supply means for forming a lubricant air layer between the mating faces of the spherical projection portion and the spherical depression portion, and fixing means including a mechanical lock for fixing the mounting table which has made a follow-up movement to the base as a separate unit from the air supply means, or a follow-up unit in a portion for mounting the resonator to the pressure unit, or the follow-up unit comprises a bearing which consists of a spherical projection portion and a spherical depression portion and which mounts the resonator to the mounting table in such a manner that the mounting table can make a follow-up movement, air supply means for forming a lubricant air layer between the mating faces of the spherical projection portion and the spherical depression portion, and fixing means including a mechanical lock for fixing the mounting table which has made a follow-up movement to the base as a separate unit from the air supply means. Therefore, pressure air is supplied from the pressure air supply system to the mating faces of the spherical projection portion and the spherical depression portion to form a lubricant air layer, the holder is lowered along a straight line by the pressure unit, the bonding work face devoid of a workpiece of the resonator is contacted to the top face of the mounting table, the mounting table makes a follow-up movement in a suitable direction with respect to the base by the bearing consisting of the spherical projection portion and the spherical depression portion so that the top face devoid of a workpiece becomes parallel to the bonding work face, the mechanical lock clamps the spherical projection portion to the spherical depression portion in this state, and the position of the mounting table can be maintained while the top face and the bonding work face are parallel to each other. When the fixing means comprises an air operation unit for enabling the mechanical lock to carry out clamping and unclamping operations with air, the structure of the fixing means can be made simpler than when the mechanical lock carries out clamping and unclamping operations with mechanical elements. When the fixing means comprises a spring for enabling the mechanical lock to carry out clamping operation, if air for enabling the mechanical lock to carry out clamping and unclamping operations is cut off, the spring can ensure the clamping operation of the mechanical lock.

DETAILED DESCRIPTION OF THE PREFERRED EMBODIMENTS

Figure 1:
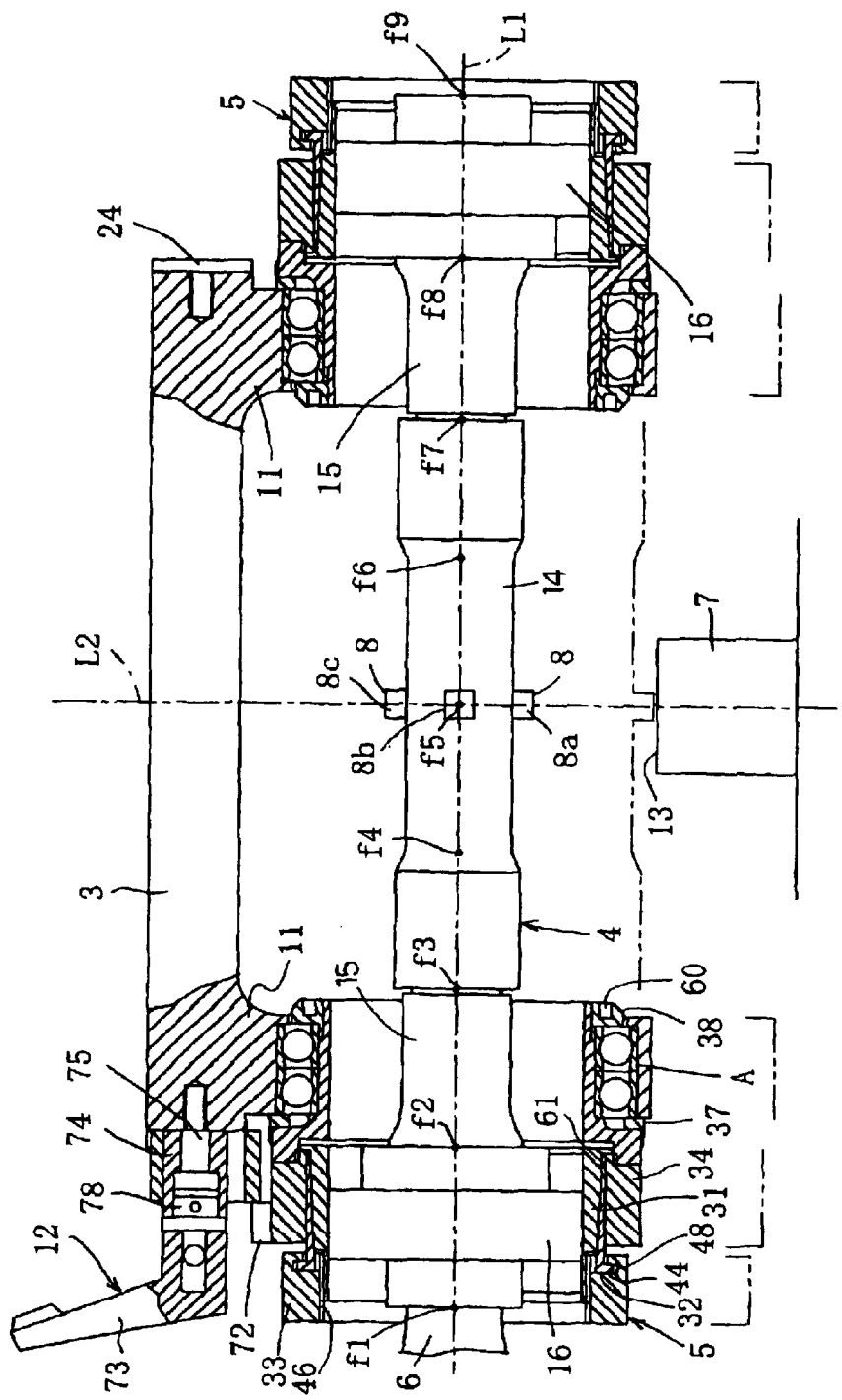
FIG. 1 is a longitudinal sectional view of a resonator support device in Embodiment 1.
Figure 2A:
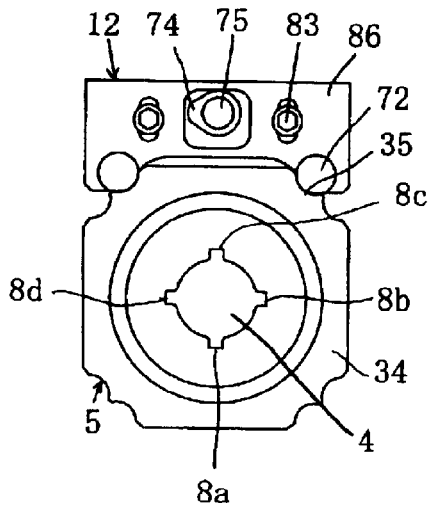
FIGS. 2A to 2D are diagrams showing the angle indexing operation of the resonator support device in Embodiment 1.
Figure 2B:
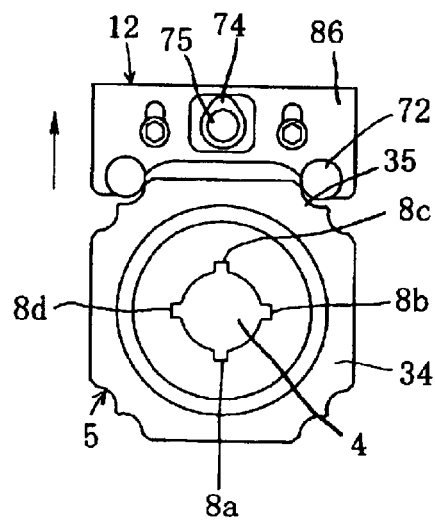
Figure 2C:
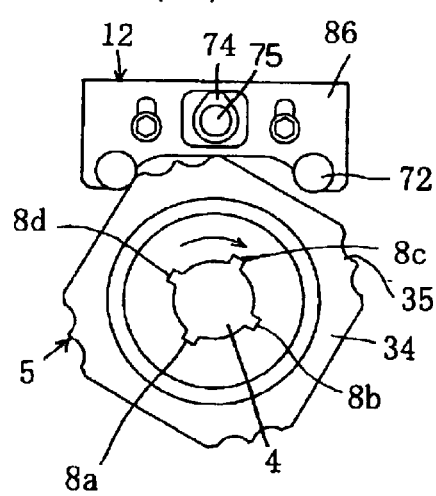
Figure 2D:
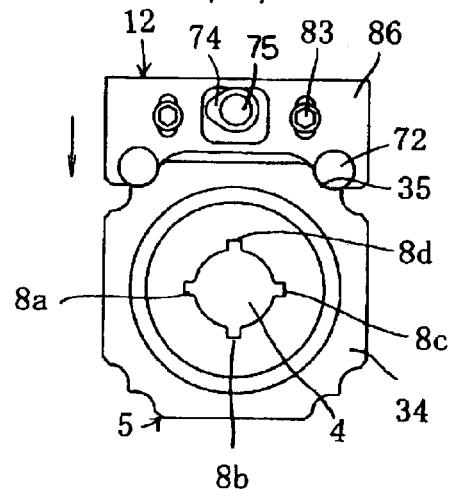
Figure 3:
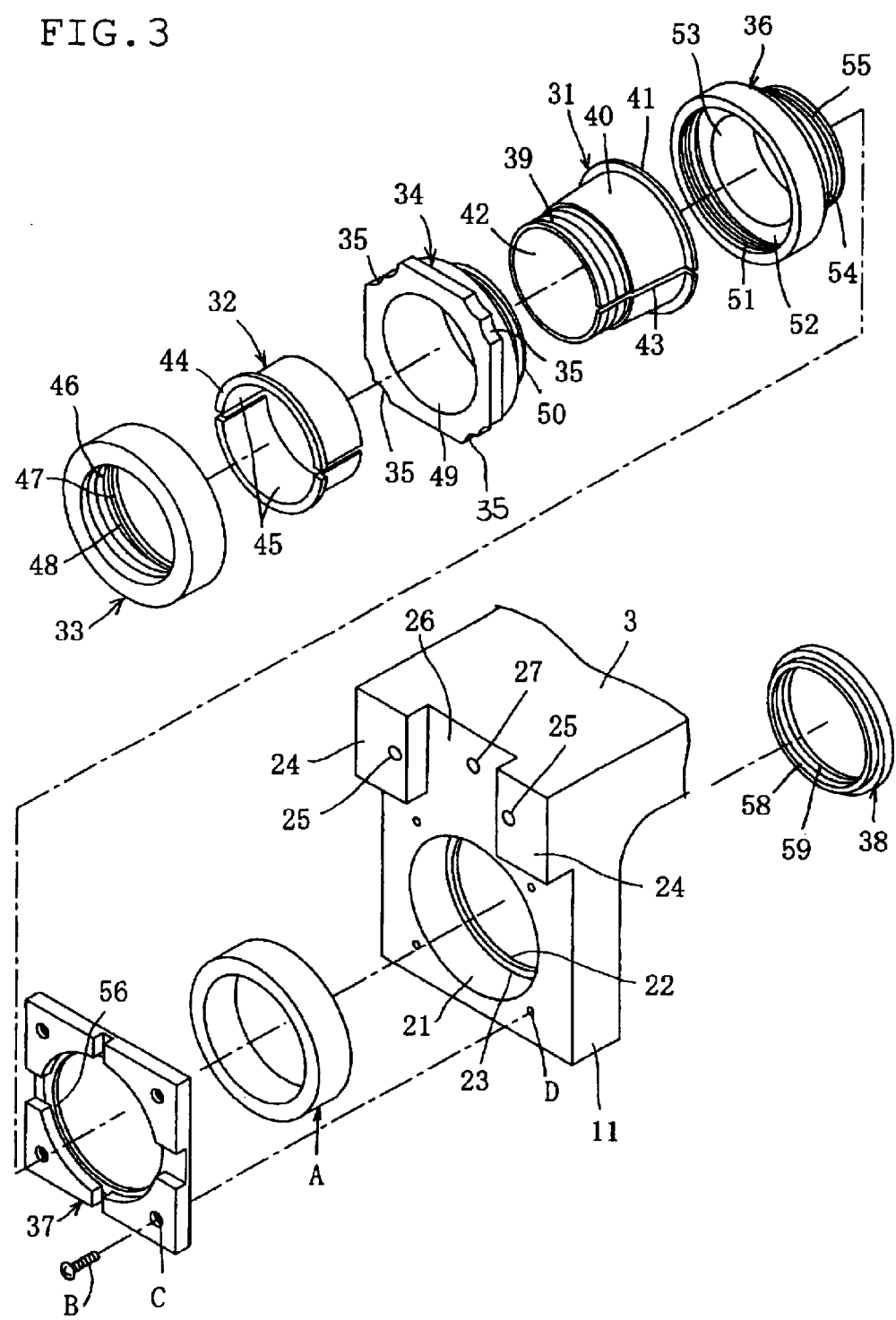
FIG. 3 is an exploded view of a rotation support unit in Embodiment 1.
Figure 4:
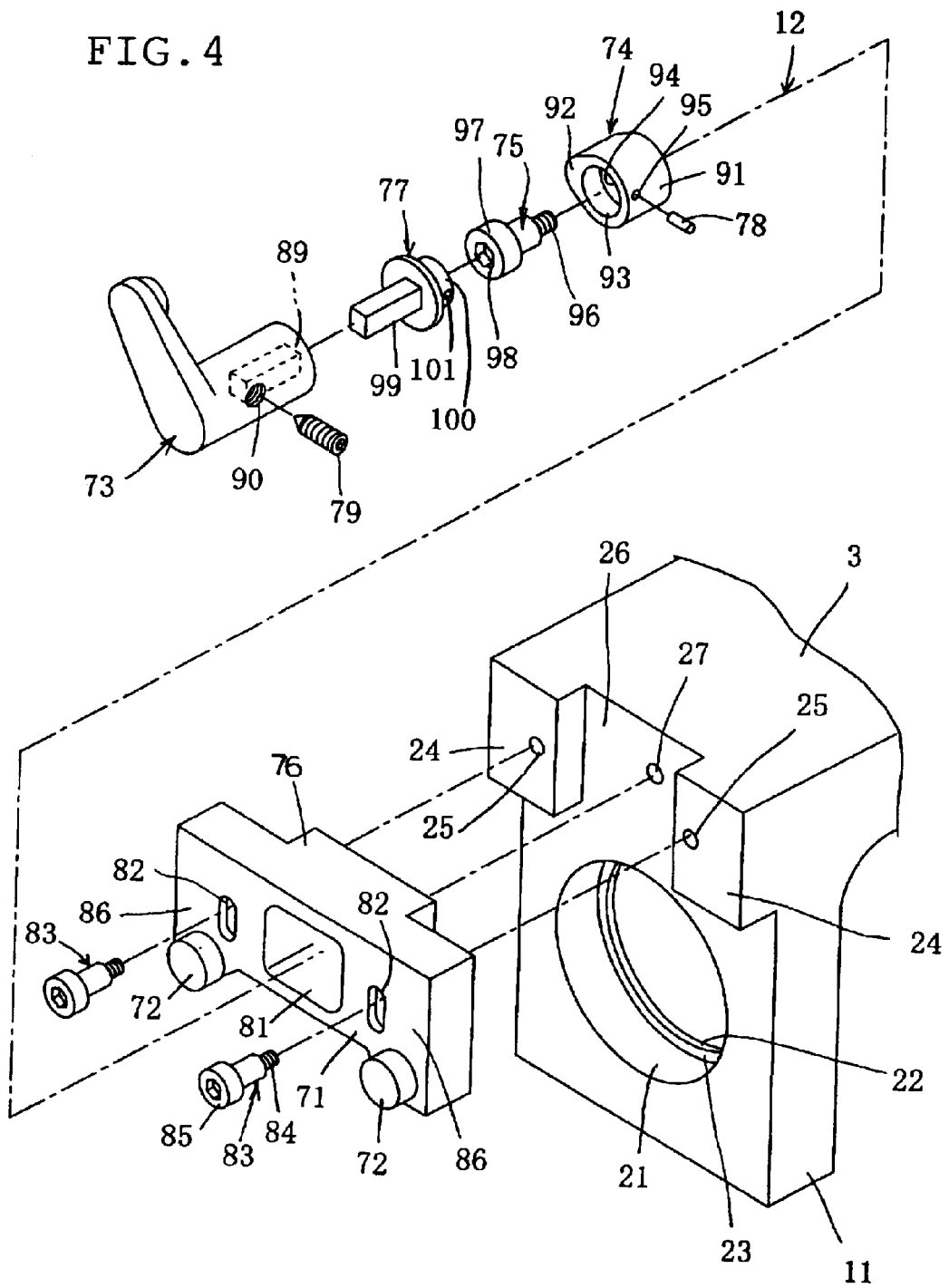
FIG. 4 is an exploded view of an angle indexing unit of Embodiment 1.
Figure 5:
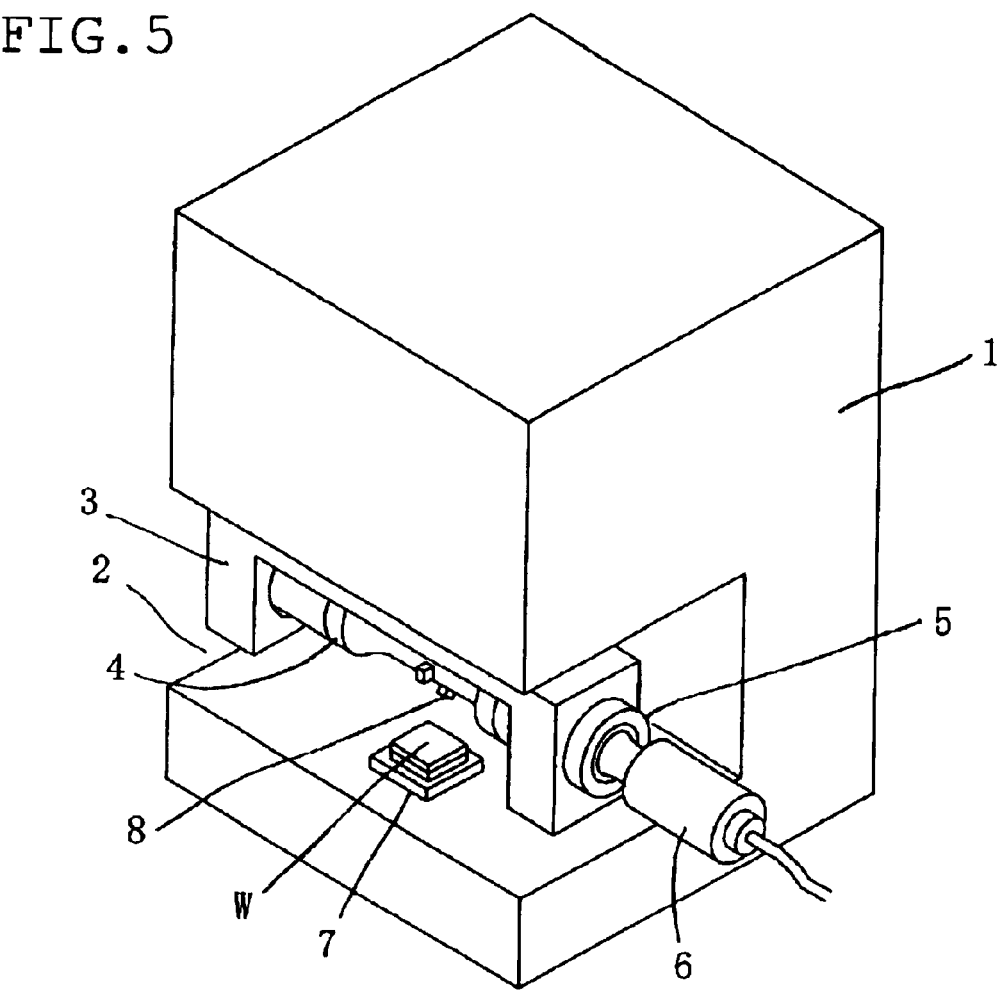
FIG. 5 is a diagram of the appearance of an ultrasonic bonding machine of Embodiment 1.

FIGS. 1 to 5 show the resonator support device of an ultrasonic bonding machine according to Embodiment 1. FIG. 1 is a longitudinal sectional view of the resonator support device. FIGS. 2A to 2D show the angle indexing operation of the resonator support device. FIG. 3 is an exploded view of a rotation support unit 5 in the resonator support apparatus. FIG. 4 is an exploded view of an angle indexing unit 12 in the resonator support device. FIG. 5 shows the appearance of the ultrasonic bonding machine.

With reference to FIG. 5, the ultrasonic bonding machine comprising the resonator support device will be described. The ultrasonic bonding machine is constituted such that a working space 2 which is open in a forward direction and left and right directions is formed in a body 1, a holder 3 is arranged in the space 2, a resonator 4 is rotatably supported to the holder 3 from both sides by rotation support units 5 arranged on right and left sides of the resonator 4 and having the same shape, one end of the resonator 4 is connected to a transducer 6 which generates ultrasonic vibration having a predetermined frequency with electric power supplied from an unshown ultrasonic wave generator, a mounting table 7 is mounted on the bottom of the working space 2, overlapped portions W of a plurality of workpieces are mounted on the mounting table 7, the holder 3 is lowered by an actuator having a pressure function such as an unshown air cylinder incorporated in the body 1 to pressure hold the overlapped portions W between the bonding work face 8 at the center of the resonator 4 and the mounting table 7, the resonator 4 resonates with ultrasonic vibration generated by the transducer 6 to bond together the overlapped portions of the workpieces, and the holder 3 is then lifted by the actuator and stopped.

Describing the resonator support device with reference to FIG. 1 and FIG. 2, the holder 3 interconnects a plurality of arm portions 11 in such a manner that they are opposed to each other in a horizontal direction at a predetermined interval, a plurality of bonding work faces 8 are provided on the resonator 4 in a circumferential direction with an axis L1 in a vibration transmission direction as the center, and the resonator 4 is supported by the arm portions 11 on both sides. As shown in FIG. 1, a plurality of bonding work faces 8 are positioned on a circumference which is coaxial to the center line L2 of the vertical movement of the holder 3 and provided in the circumferential direction of the resonator 4. The resonator support device comprises rotation support units 5 and an angle indexing unit 12 which are mounted to the holder 3, the rotation support units 5 mount the resonator 4 to the arm portions 11 in such a manner that it can turn with the axis L1 in the vibration transmission direction as the center of rotation, and the angle indexing unit 12 secures the resonator 4 to the arm portions 11 at an indexing angle in the circumferential direction with the axis L1 in the vibration transmission direction of the plurality of bonding work faces 8 as the center. One bonding work face 8 facing down of the resonator 4 and the top face 13 mounting the overlapped portions W (see FIG. 5) of the mounting table 7 are opposed to each other and parallel to each other and are flat faces perpendicular to the center line 2 of the vertical movement of the holder 3. An unshown mark showing the center of the horizontal direction on the mounting table 7 is arranged coaxial to the center line L2 of the vertical movement of the holder 3.

The resonator 4 comprises boosters 15 connected coaxially to the both sides of a horn 14 by unshown screw holes (threaded holes) and unshown headless bolts. One end face of one of the boosters 15 is connected coaxially to a transducer 6 by an unshown screw hole and an unshown headless bolt. The horn 14 has a length equal to one wavelength from the maximum vibration amplitude point f3 to the maximum vibration amplitude point f7 and comprises bonding work faces 8 on its outer wall positioned at the maximum vibration amplitude point f5 at the center. One of the boosters 15 has a wavelength equal to ½ the wavelength from the maximum vibration amplitude point f1 to the maximum vibration amplitude point f3, resonates with ultrasonic vibration transmitted from the transducer 6, and has a support portion 16 which is crooked outward and projects annularly from the minimum vibration amplitude point f2 at the center. The other booster 15 has a length equal to ½ the wavelength from the maximum vibration amplitude point f7 to the maximum vibration amplitude point f9, resonates with ultrasonic vibration transmitted from the transducer 6, and has a support portion 16 which is crooked outward and projects annularly from the minimum vibration amplitude point f8 at the center. The outer walls of the support portions 16 are round and located on one circumference having an axis in the vibration transmission direction as the center.

As shown in FIGS. 2A to 2D, a plurality of bonding work faces 8a, 8b, 8c and 8d are provided at four equiangular positions of the outer wall of the resonator 4 so that they are located on two straight lines which pass through the axis L1 in the vibration transmission direction and cross each other at a right angle and are flat faces perpendicular to the two straight lines. The bonding work faces 8a to 8d may project or sink from the outer wall of the resonator 4. When a portion provided with the bonding work faces 8a to 8d of the resonator 4 has a square section, the bonding work faces 8a to 8d may be flush with the outer walls of the resonator 4. For example, to replace one bonding work face 8a out of the bonding work faces 8a to 8d used for bonding by another bonding work face 8b as shown in FIGS. 2A to 2D, the ultrasonic bonding machine operates as follows. While the angle indexing unit 12 and the rotation support unit 5 are connected to each other and one bonding work face 8a is located at the lowest position as shown in FIG. 2A, the angle indexing unit 12 is moved up to be disconnected from the rotation support unit 5 as shown in FIG. 2B. Thereafter, the rotation support unit 5 is turned clockwise with the axis L1 in the vibration transmission direction as the center of rotation as shown in FIG. 2C. When the rotation support unit 5 is turned clockwise at 90° from its position shown in FIG. 2A, the angle indexing unit 12 is moved down to be connected to the rotation support unit 5. Thereby, another bonding work face 8b replaces the bonding work face 8a and becomes the bonding work face 8 used for bonding.

With reference to FIG. 3, the internal structure of the arm portion 11 of the holder 3 and the internal structure of the rotation support unit 5 will be described. The arm portion 11 has a round depression portion 21 which is open to the outer side thereof, a through hole 22 having a smaller diameter than the depression portion 21 is formed in the bottom of the depression portion 21, an annular stepped portion 23 is formed at the boundary between the through hole 22 and the depression portion 21, and screw holes D for accepting a stopping screw B are formed around the through hole 22. The stepped portion 23 is formed annular to hold the inner ring of a bearing A. The depression portion 21, through hole 22 and stepped portion 23 are formed coaxial to one another with a horizontal straight line (the same straight line as the axis (axis L1 in the vibration transmission direction) in the vibration transmission direction of the resonator 4) perpendicular to the center line L2 of the vertical movement of the holder 3 as the center. The holder 3 has pedestals 24 which project outward in a direction parallel to the axis L1 in the vibration transmission direction and are situated at the front and rear sides above the arm portion 11 of the holder 3. A guide groove 26 extending in a vertical direction is formed between the pedestals 24, and a screw hole 27 for accepting the cam shaft 75 of the angle indexing unit 12 shown in FIG. 4 is formed in the guide groove 26.

The rotation support unit 5 comprises a wedge inner cylinder 31, wedge outer cylinder 32, wedge-side nut 33, bearing A, wedge cover body 34, stopping portions 35, bearing support body 36, bearing receiving body 37 and bearing-side nut 38. The wedge inner cylinder 31 has a male screw portion 39 on one half of its outer wall, a wedge portion 40 whose outer diameter gradually increases from the male screw portion 39 toward the opposite side on the other half of its outer wall, and a collar portion 41 at the large-diameter side end of the wedge portion 40. The wedge inner cylinder 31 has a round inner hole 42 having substantially the same diameter as the outer diameter of the support portion 16 of the booster 15 shown in FIG. 1, a slit 43 is formed in the outer wall at one location to increase the diameter of the inner hole 42 large enough to store the support portion 16 in contact therewith by the elastic function of the wedge inner cylinder 31, and the outer diameter of the end portion on the large-diameter opening side of the wedge portion 40 is smaller than the inner diameter of the bearing support body 36. The male screw portion 39, wedge portion 40 and inner hole 42 are coaxial to one another.

The wedge outer cylinder 32 has an annular collar portion 44 which projects outward in a radial direction at one end of the outer wall formed round and having substantially the same diameter as the inner diameter of the wedge support portion 49 of the wedge cover body 34 and a wedge portion 45 on the inner wall whose inner diameter gradually increases from the collar portion 44 toward the opposite side. The wedge outer cylinder 32 comprises the wedge portion 45 which has the same inclination angle as the wedge portion 40 of the wedge inner cylinder 31, extends therethrough and is divided into two at its diameter portion. The wedge outer cylinder 32 may be formed like the wedge inner cylinder 31 that the slit is formed in the outer wall at one location to reduce its inner diameter. The collar portion 44 and the wedge portion 45 are coaxial to each other. The wedge-side nut 33 has therein a threaded portion 46 to be mated with the male screw portion 39 of the wedge inner cylinder 31 and an insertion hole 47 into which the outer portion excluding the collar portion 44 of the wedge outer cylinder 32 can be inserted at the other end, and an annular groove portion 48 for storing the collar portion 44 of the wedge outer cylinder 32 between the insertion hole 47 and the threaded portion 46. The wedge cover body 34 has a wedge support portion 49 to be mated with the wedge portion 45 of the wedge outer cylinder 32 on one half of its inner wall and a male screw portion 50 to be screwed into the threaded portion 52 of the bearing support body 36 at the other end. The stopping portions 35 are elements for fixing the resonator 4 in cooperation with the stoppers 72 of the angle indexing unit 12 at an indexing angle (90° in Embodiment 1) in the circumferential direction of the plurality of bonding work faces 8 with the axis L1 in the vibration transmission direction as the center and are depressions formed at four equiangular positions of the outer wall of the wedge cover body 34.

The bearing support body 36 has a depression portion 51 formed round and having substantially the same diameter as the outer diameter of the collar portion 41 of the wedge inner cylinder 31 at one end, a threaded portion 52 to be mated with the male screw portion 50 of the wedge cover body 34 in the inner wall of the depression portion 51, a cylindrical bearing support portion 53 to be mated with the outer wall of the outer ring of the bearing A on one half of its inner wall, a projection 54 in a connection portion between the wall surrounding the depression portion 51 and the wall surrounding the bearing support portion 53, and a male screw portion 55 to be mated with the threaded portion 58 of the bearing-side nut 38 at the other end of the bearing support portion 53. The bearing receiving body 37 has a through hole 56 having a diameter larger than the inner ring and smaller than the outer ring of the bearing A, is shaped like a plate with an outer diameter larger than the outer ring, and includes through holes C into which stopper screws B for attaching the bearing receiving body 37 to the arm portion 11 are inserted in its peripheral portion. The bearing-side nut 38 is annular with an outer diameter smaller than the through hole 22 of the holder 3 and has a threaded portion 58 to be mated with the male screw portion 55 of the bearing support body 36 on its inner wall, an annular projection 59 for pressing the inner ring of the bearing A on one end face, and a depression portion 60 (see FIG. 1) for accepting a tool for fastening and loosening the bearing-side nut 38 on the other end face.

With reference to FIG. 1 and FIG. 3, a case where the resonator 4 is mounted to the holder 3 by the rotation support unit 5 will be described. After the bearing A is inserted into the depression portion 21 of the arm portion 11 of the holder 3 from outside, the bearing receiving body 37 is applied to the end face around the opening of the depression portion 21 of the arm portion 11 and to the end face of the outer ring of the bearing A, the stopper screws B are screwed into the screw holes D of the arm portion 11 from the through holes C of the bearing receiving body 37 to attach the bearing A to the arm portion 11, the bearing support portion 53 of the bearing support body 36 is inserted into the bearing A from outside in the vibration transmission direction of the arm portion 11, the male screw portion 55 projecting inward in the vibration transmission direction from the bearing A of the bearing support body 36 is screwed into the threaded portion 58 of the bearing-side nut 38, and the bearing-side nut 38 is fastened by an unshown fastening tool inserted into the depression portion 60 to support the outer ring of the bearing A between the stepped portion 23 of the arm portion 11 and the bearing receiving body 37 from both sides in the vibration transmission direction so that the inner ring of the bearing A is sandwiched between the projection 54 of the bearing support body 36 and the projection 59 of the bearing-side nut 38 from both sides in the vibration transmission direction. Thus, the bearing A is independently set in the arm portion 11 of the holder 3.

The collar portion 44 of the wedge outer cylinder 32 is fitted into the groove portion 48 of the wedge-side nut 33, the wedge portion 45 of the wedge outer cylinder 32 projecting from the wedge-side nut 33 and the wedge support portion 49 of the wedge cover body 34 are mated with each other, the wedge portion 45 of the wedge outer cylinder 32 and the wedge portion 40 of the wedge inner cylinder 31 are mated with each other, the collar portion 41 of the wedge inner cylinder 31 projecting from the male screw portion 50 of the wedge cover body 34 is mounted to the bottom of the depression portion 51 through the threaded portion 52 of the bearing support body 36, the male screw portion 50 of the wedge cover body 34 is screwed into the threaded portion 52 of the bearing support body 36, and the threaded portion 46 of the wedge-side nut 33 is mated with the male screw portion 39 of the wedge inner cylinder 31. Thus, the two rotation support units 5, each consisting of the wedge inner cylinder 31, wedge outer cylinder 32, wedge-side nut 33, bearing A, bearing receiving body 37, bearing support body 36, wedge cover body 34, stopper portions 35 and bearing-side nut 38, are assembled with the respective arm portions 11 of the holder 3.

Thereafter, by fastening the wedge-side nut 33, the wedge portion 40 of the wedge inner cylinder 31 is contacted to the wedge portion 45 of the wedge outer cylinder 32, the outer wall of the wedge outer cylinder 32 is contacted to the inner wall of the through hole of the wedge cover body 34, and the diameter of the inner hole 42 of the wedge inner cylinder 31 is opened wide enough to store the support portion 16 of the booster 15 in such a manner that it comes into contact with the wedge inner cylinder 31. In this state, as shown in FIG. 1, a space 61 is formed between the end portion on the large-diameter opening side of the wedge outer cylinder 32 and the collar portion 41 of the wedge inner cylinder 31, and the wedge-side nut 33 is apart from the wedge cover body 34.

Subsequently, as shown in FIG. 1, the booster 15 to be positioned on a side opposite to the transducer 6 of the resonator 4 is inserted into the inner hole 42 of the right rotation support unit 5 through the inner hole 42 of the wedge inner cylinder 31 of the left rotation support unit 5, and the booster 15 to be positioned on the transducer 6 side is inserted into the inner hole 42 of the left rotation support unit 5. Thereafter, a member having the same thickness as the overlapped portions W of the workpieces is mounted on the mounting table 7, or the holder 3 is lowered without mounting the member on the mounting table 7 to contact one bonding work face 8 facing down of the resonator 4 to the member on the mounting table 7 or the mounting table 7 to achieve parallelism between the bonding work face 8 facing down of the resonator 4 and the top face 13 of the mounting table 7. In this case, the air pressure of an air cylinder for moving the holder 3 vertically is reduced to such an extent that the holder 3 having weight including the resonator 4 and the transducer 6 does not fall by its own weight. The resonator 4 is moved in a horizontal direction by hand to align the bonding work face 8 facing down of the resonator 4 with an unshown mark on the mounting table 7 so that the bonding work face 8 is positioned on the center line L2 of the vertical movement of the holder 3.

Further, one bonding work face 8 facing down of the above resonator 4 is contacted to the member on the mounting table 7 or the top face 13 of the mounting table 7, the wedge-side nut 33 is fastened while parallelism between the bonding work face 8 facing down of the resonator 4 and the top face 13 of the mounting table 7 is maintained so that the wedge-side nut 33 presses the wedge outer cylinder 32 against the stepped portion 23 of the holder 3, the interval of the slit 43 of the wedge inner cylinder 31 is reduced by external force in a pressing direction received by the wedge outer cylinder 32 from the depression portion 21 of the holder 3 and the wedge function of the wedge portions 40 and 45, and the inner hole 42 of the wedge inner cylinder 31 shrinks and becomes round to squeeze the outer wall of the support portion 16 of the resonator 4 from outside in the radial direction. Thereby, the resonator 4 having a plurality of bonding work faces 8 is mounted to the holder 3 by the rotation support units 5 in such a manner that it can turn with the axis L1 in the vibration transmission direction as the center of rotation.

With reference to FIG. 4, the internal structure of the angle indexing unit 12 will be described below. The angle indexing unit 12 comprises an angle indexing body 71, stoppers 72, operation body 73, cam 74, cam shaft 75, guide projection 76 as a guide, connector 77, pin 78, stopper screw 79 such as a set screw and stopper portions 35 shown in FIG. 3. The angle indexing body 71 is like a prolonged plate, can move in a direction perpendicular to the axis L1 in the vibration transmission direction shown in FIG. 1 of the holder 3 (the same direction as the direction of the upward movement of the holder 3; vertical direction) and has a through hole 81 parallel to the axis L1 in the vibration transmission direction at the center in the horizontal direction, a guide projection 76 engaged with and in slide contact with the guide groove 26 of the holder 3, and vertically prolonged holes 82 in both side portions on right and left sides of the guide projection 76. While the guide projection 76 is mated with the guide groove 26 of the holder 3, the screw portions 84 of fixtures 83 such as stepped screws are screwed into the screw holes 25 of the holder 3 through the longitudinally prolonged holes 82 from the outside of the angle indexing body 71 to sandwich portions around the vertically prolonged holes 82 of the angle indexing body 71 between the head portions 85 of the fixtures 83 and the pedestals 24 in the same horizontal direction as the axis L1 in the vibration transmission direction before the fixtures 83 are butted against the pedestals 24 of the holder 3 around the screw holes 25. As a result, the fixtures 83 fix the angel indexing body 71 to the holder 3 so that it does not move in a vertical direction. By loosening the male screw portions 84 of the fixtures 83 from the screw holes 25 in this state, the head portions 85 of the fixtures 83 are opposed to portions around the vertically prolonged holes 82 of the angle indexing body 71 without contact, and the fixtures 83 can move the angle indexing body 71 vertically along the holder 3 and prevent the angel indexing body 71 from falling.

The guide projection 76 has a larger width in a transverse direction than the through hole 81 and is situated at the rear side of the angle indexing body 71. The through hole 81 is formed in the angle indexing body 71 and the guide projection 76. The stoppers 72 are rotatably attached to projecting portions 86 projecting from the both right and left end portions of the angle indexing body 71. While the stoppers 72 are fitted in the projection portions 86, parts of the outer portions of the stoppers 72 project from the projection portions 86. The stopper portions 35 are formed in the wedge cover body 34 of the rotation support unit 5 and mated with parts of the outer portions projecting from the projection portions 86 of the stoppers 72 at an indexing angle of the plurality of bonding work faces 8. The operation body 73 is rotatably mounted to the holder 3, and the cam 74 is fixed to the operation body 73. In Embodiment 1, the connection structure between the operation body 73 and the cam 74 is as follows. The operation body 73 has a square deformed hole 89 in one end portion and a screw hole 90 extending from the outer wall of one end portion to the deformed hole 89. The cam has a cam portion 92 projecting in a radial direction from the peripheral portion of a round base portion 91, a round depression portion 93 which is open to one end portion of the base portion 91, a bearing hole 94 which is smaller in diameter than the depression portion 93 and is formed in the bottom of the depression portion 93, and a pin insertion hole 95 extending from the bearing hole 94 to the outer wall of one end portion.

The cam 74 is arranged in the guide groove 26 of the holder 3 through the through hole 81 from the outside of the angle indexing body 71 mounted to the holder 3, the male screw portion 96 of the cam shaft 75 is screwed into the screw hole 27 of the holder 3 through the bearing hole 94 from the depression portion 93 of the cam 74, the cam shaft 75 is fastened by an unshown fastening tool inserted into the depression portion 98 of the head portion 97 so that the cam shaft 75 is contacted to the face of the guide groove 26 around the screw hole 27 and fixed to the holder 3, the cam shaft 75 and the bearing hole 94 are rotatably mated with each other, the head portion 97 of the cam shaft 75 is situated on the bearing hole 94 side of the depression portion 93, and the cam 74 is rotatably mounted to the holder 3. Meanwhile, the square rod portion 99 of the connector 77 is inserted into the deformed hole 89 of the operation body 73, and the stopper screw 79 is screwed into the screw hole 90 from the outside of the operation body 73 to be butted against the square rod portion 99 so that the connector 77 and the operation body 73 are assembled together. The disk portion 100 of the connector 77 is fitted in the depression portion 93 of the cam 74, and the pin 78 is pressed into the pin insertion hole 101 of the disk portion 100 of the connector 77 through the pin insertion hole 95 of the cam 74 from the outside of the cam 74 to assemble the connector 77 with the cam 74. The operation body 73 and the cam 74 are thereby connected to each other by the connector 77 in such a manner that they can turn together.

When the operation body 73 is operated, the cam 74 turns on the cam shaft 75 relative to the holder 3, the cam portion 92 of the cam 74 contacts the upper inner wall surrounding the through hole 81 of the angle indexing body 71 to raise the angle indexing body 71 relative to the holder 3, and the stoppers 72 are moved up and separated from the stopper portions 35 by the upward movement of the angle indexing body 71 as shown in FIG. 2B.

Referring to FIGS. 2A to 2D, a case where the bonding work face 8a facing downward out of the bonding work faces 8 used for bonding is replaced by another bonding work face 8b will be described in detail. In FIG. 2A, the cam portion 92 (see FIG. 4) of the cam 74 of the angle indexing unit 12 faces the left direction of the cam shaft 75 and apart from the inner wall of the through hole 81 of the angle indexing body 71, the stoppers 72 of the angle indexing unit 12 and the stopper portions 35 of the rotation support unit 5 are connected to each other, and the bonding work face 8a is situated at the lowest position. In this state, when an operator loosens the fixtures 83 shown in FIG. 2A to cancel the fixing of the angle indexing body 71 to the holder 3 by the fixtures 83 and then turns the operation body 73 shown in FIG. 4 clockwise by hand, as shown in FIG. 2B, the cam 74 of the angle indexing unit 12 turns clockwise with the cam shaft 75 as the center of rotation, and the cam portion 92 is turned to the upward direction of the cam shaft 75. When the cam portion 92 faces upward, the operator stops the operation of turning the above operation body 73 clockwise.

Thus, while the cam portion 92 changes its direction from a right direction shown in FIG. 2A to an upward direction shown in FIG. 2B, after it contacts the upper inner wall of the through hole 81, it moves up the angle indexing body 71, and connection between the above stoppers 72 and the stopper portions 35 is canceled by the upward movement of the angle indexing body 71. Thereafter, when the operator turns the wedge cover body 34 clockwise by hand in FIG. 2C, the resonator 4 is turned clockwise with the axis L1 in the vibration transmission direction as the center of rotation. When the resonator 4 is turned at 90° from its position shown in FIG. 2A as shown in FIG. 2D, the operator turns the operation body 73 shown in FIG. 4 counterclockwise by hand, the cam 74 of the angle indexing unit 12 is turned counterclockwise with the cam shaft 75 as the center of rotation, the cam portion 92 is turned to the left direction of the cam shaft 75. When the cam portion 92 faces the left direction, the operator stops the operation of turning the above operation body 73 counterclockwise.

Thus, while the cam portion 92 changes its direction from an upward direction shown in FIG. 2C to a left direction shown in FIG. 2D, as the cam portion 92 separates from the upper inner wall of the through hole 81, and the angle indexing body 71 moves down by its own weight. When the downward movement of the angle indexing body 71 by its own weight is not appropriate, the operator press down a portion around the stopper portions 35 of the angle indexing body 71 by hand. The stoppers 72 and the stopper portions 35 are connected to each other by the downward movement of the angle indexing body 71. Thereby, another bonding work face 8b becomes a bonding work face 8 used for bonding in place of the above bonding work face 8a. After the bonding work face 8a is replaced by another bonding work face 8b, the operator fastens the fixtures 83 to fix the angle indexing body 71 to the holder 3 in order to maintain connection between the stoppers 72 and the stopper portions 35, whereby the new bonding work face 8b becomes parallel to the top face 13 of the mounting table 7 shown in FIG. 1.

Figure 6:
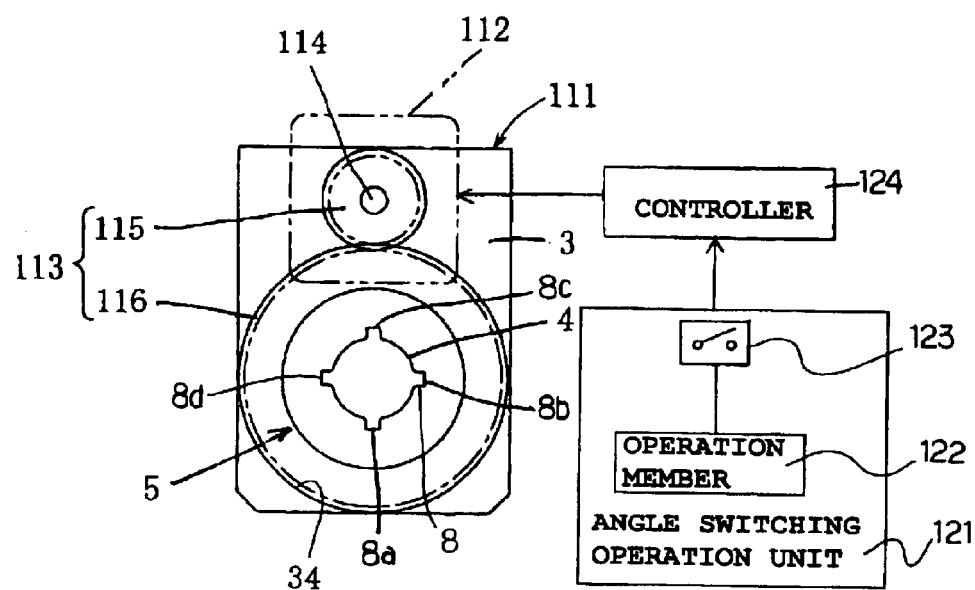
FIG. 6 is a side view of an angle indexing unit in Embodiment 2.
Figure 7:
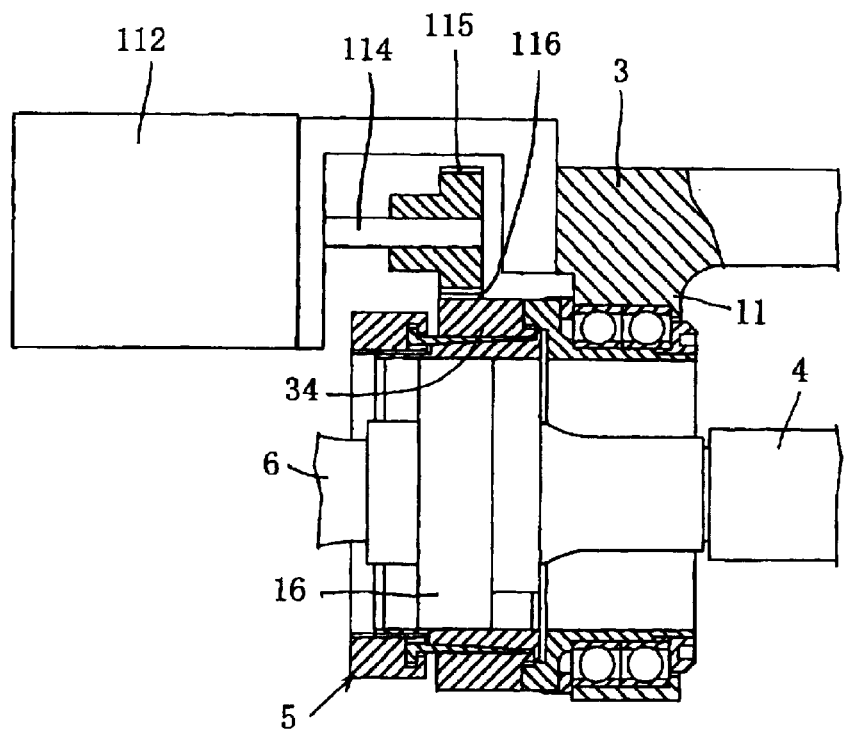
FIG. 7 is a sectional view of the internal structure of the angle indexing unit in Embodiment 2.

FIG. 6 and FIG. 7 show the resonator support device of the ultrasonic bonding machine according to Embodiment 2. FIG. 6 is a side view of an angle indexing unit 111 and FIG. 7 is a section view of the internal structure of the angle indexing unit 111. In Embodiment 1, the angle indexing unit 12 is of a manual type whereas in Embodiment 2, the angle indexing unit 111 is of a drive type. In FIG. 6 and FIG. 7, the angle indexing unit 111 comprises a step motor 112 mounted to the holder 3 and a train of gears 113 for transmitting the revolution of the step motor 112 to the rotation support unit 5. The train of gears 113 consists of a small-diameter gear 115 which is connected to the output shaft 114 of the step motor 112 so that it is turned together with the output shaft 114 of the step motor 112 and a large-diameter gear 116 which is attached to the wedge cover body 34 of the rotation support unit 5 so that it is turned together with the wedge cover unit 34 of the rotation support unit 5. In Embodiment 2, the large-diameter gear 116 is attached to a cylindrical portion surrounding the wedge portion 45 and formed by removing the stopper portions 35 from the wedge cover body 34 in FIG. 3 so that it is turned together with the cylindrical portion.

Therefore, when the operator operates the operation member 122 like a button of an angle switching operation unit 121 shown in FIG. 6 to replace the bonding work face 8a by the bonding work face 8b as shown in FIGS. 2A to 2D, the switch 123 of the angle switching operation unit 121 outputs an angle switching start signal to a controller 124 which in turn drives the step motor 112 at a rotation angle of 90°. The rotation support unit 5 is turned at a rotation angle of 90° by the revolution of the step motor 112 through the train of gears 113, and the resonator 4 is turned with the axis L1 in the vibration transmission direction as the center of rotation by the rotation of the rotation support unit 5, and the bonding work face 8b becomes the bonding work face 8 used for bonding in place of the bonding work face 8a. By replacing the bonding work face 8a by the bonding work face 8b, the revolution of the step motor 112 by the above controller 124 is stopped. After the stoppage of the revolution of the step motor 112 by the controller 124, the rotation support unit 5 is held not to be turned by the function of holding the rotation position of the step motor 112 by a permanent magnet, and the resonator 4 is not turned with the axis L1 in the vibration transmission direction as the center of rotation, thereby making it possible to keep the bonding work face 8b facing downward.

Figure 8:
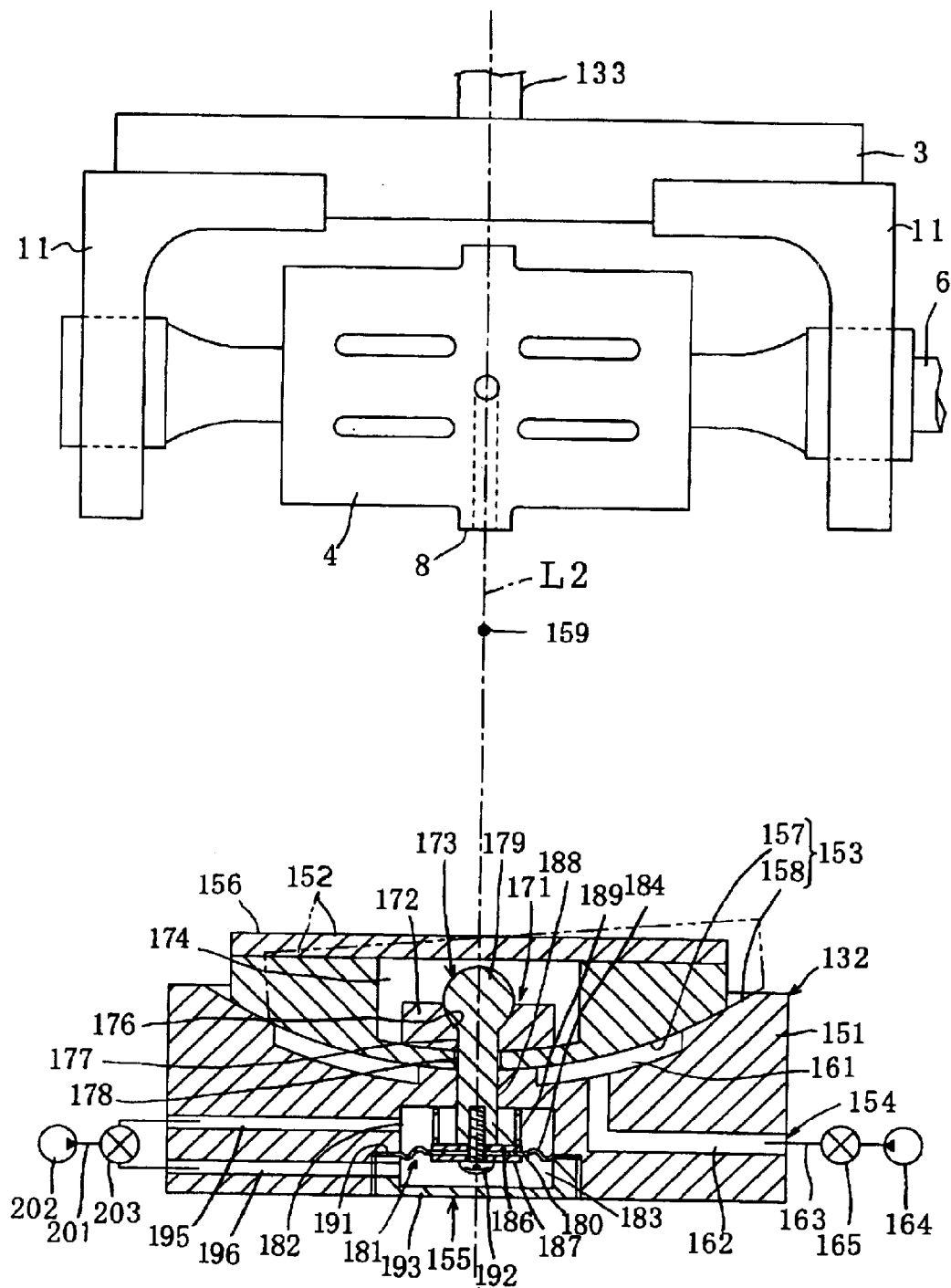
FIG. 8 is a sectional view of a mounting unit in Embodiment 3.
Figure 9:
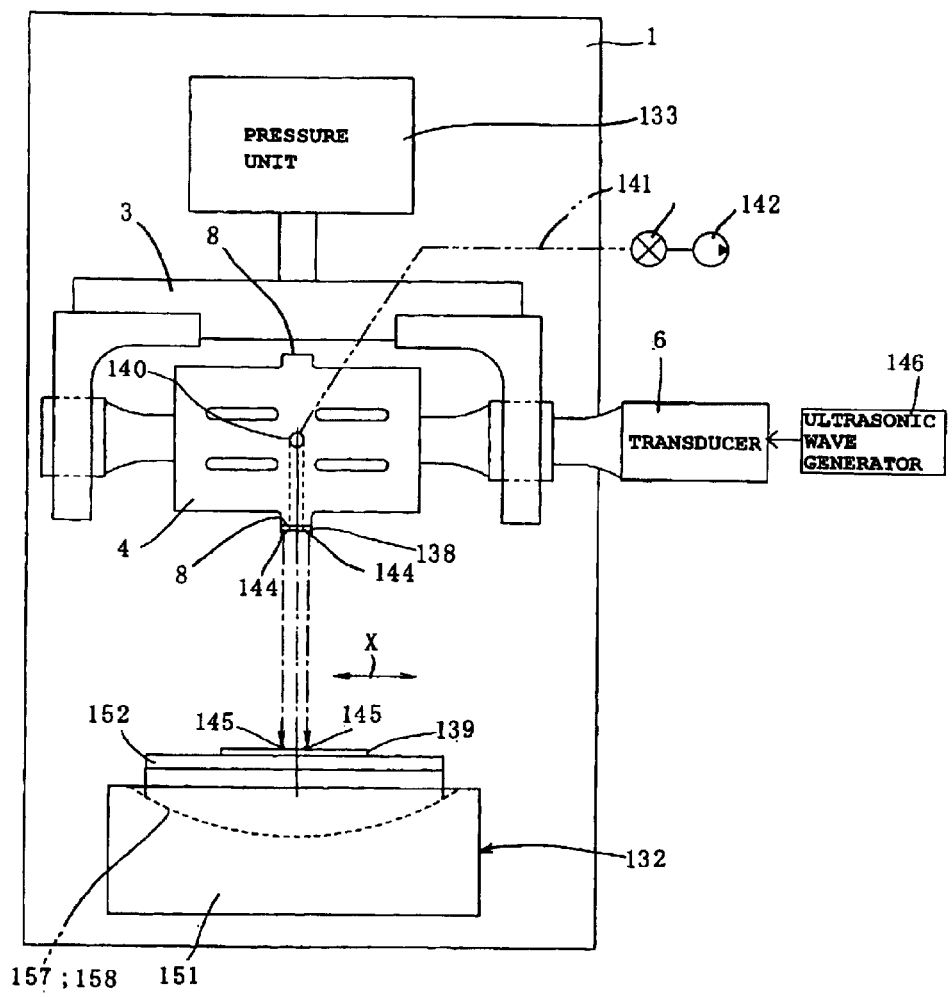
FIG. 9 is a diagram of an ultrasonic bonding machine in Embodiment 3.

FIG. 8 and FIG. 9 show the mounting unit 132 of the ultrasonic bonding machine according to Embodiment 3. FIG. 8 is a sectional view of the mounting unit 132 and FIG. 9 is a schematic diagram of the ultrasonic bonding machine.

Referring to FIG. 9, the ultrasonic bonding machine will be described. The ultrasonic bonding machine comprises the mounting unit 132 at the bottom of a body 1, a pressure unit 133 at an upper position of the body 1 and the holder 3 at the output end of the pressure unit 133. The holder 3 comprises a plurality of arm portions 11 on right and left sides at a predetermined interval. The resonator 4 is mounted to the holder 3. The arm portions 11 of the holder 3 are supported on both sides of the bonding work face 8 of the resonator 4. The transducer 6 for generating ultrasonic vibration with electric power supplied from an ultrasonic wave generator 146 is connected to one end of the resonator 4. When the resonator 4 resonates with ultrasonic vibration transmitted from the transducer 6, the bonding work face 8 is positioned at the maximum vibration amplitude point (barrel) of ultrasonic vibration in the resonator 4 and vibrates with ultrasonic waves in a direction shown by an arrow X. When the resonator 4 resonates with ultrasonic vibration transmitted from the transducer 6, the support portions for the resonator 4 of the holder 3 are located at the minimum vibration amplitude points (nodal points) of ultrasonic vibration in the resonator 4, and ultrasonic vibration is not transmitted from the resonator 4 to the holder 3. Describing a case where a semiconductor device 138 such as a semiconductor chip is bonded to a circuit substrate 139 as another workpiece by the ultrasonic bonding machine, the resonator 4 has a suction passage 140 which extends from the bonding work face 8 to the outer wall of the resonator 4, and a suction system 141 is connected to the suction passage 140 at the outer wall of the resonator 4.

When the valve 143 of the suction system 141 is opened while a suction source 142 such as a vacuum pump of the suction system 141 is in operation, the semiconductor device 138 is adsorbed to the bonding work face 8 of the resonator 4 in such a manner that the electrodes 144 of the semiconductor device 138 face down. The circuit substrate 139 is mounted on the mounting unit 132 in such a manner that the electrodes 145 of the circuit substrate 139 face up. Thereafter, when the holder 3 is lowered by the pressure unit 133, the electrodes 145 and the electrodes 145 are pressure held between the bonding work face 8 and the mounting unit 132, the bonding work face 8 vibrates in the direction shown by the arrow X as the resonator 4 resonates with ultrasonic vibration generated by the transducer 6, the mating faces of the electrodes 144 and the electrodes 145 which are overlapped portions W to be bonded of a plurality of workpieces are integrally bonded together while they are molten by friction heat generated between the mating faces. Then, the holder 3 is lifted by the pressure unit 133 and stopped at its original position.

With reference to FIG. 8, the structure of the mounting unit 132 will be described. The mounting unit 132 comprises a base 151, mounting table 152, bearing 153, air supply means 154 and fixing means 155. The base 151 is placed at the bottom of the body 1 shown in FIG. 9. The mounting table 152 is like a plate with a top face 156 for mounting a workpiece. The bearing 153 is an element which mounts the mounting table 152 on the base 151 in such a manner that the mounting table 152 can make a follow-up movement and consists of a spherical projection portion 157 and a spherical depression portion 158. In Embodiment 3, the spherical projection portion 157 is placed under the mounting table 152, the spherical depression portion 158 is formed in the top portion of the base 151, the spherical projection portion 157 and the spherical depression portion 158 are mated together to mount the mounting table 152 on the base 151 in such a manner that the mounting table 152 can make a follow-up movement. Although the rotation centers 159 of the semi-spherical convex face of the spherical projection portion 157 and the semi-spherical concave face of the spherical depression portion 158 are existent above the mounting table 152, if the rotation centers 159 are existent on the top face 156 of the mounting table 152, the follow-up movement of the mounting table 152 becomes the best though the height of the mounting unit 132 becomes large.

The air supply means 154 is an element for forming a lubricant air layer between the mating faces of the spherical projection portion 157 and the spherical depression portion 158, and comprises a groove 161 formed in the spherical depression portion 158, a pressure air passage 162 formed in the base 151 and a pressure air supply system 163 as a separate body from the base 151 and the spherical depression portion 158. The groove 161 sinks into the spherical depression portion 158 from the semi-spherical convex face of the spherical depression portion 158 and surrounds the center portion of the spherical depression portion 158. The pressure air passage 162 is formed in the base 151 and extends from the bottom of the groove 161 to one side face of the base 151. The pressure air supply system 163 is connected to the pressure air passage 162 on one side face of the base 151. When the air pressure supply source 164 such as an air compressor of the pressure air supply system 163 is activated to open the valve 165 of the pressure air supply system 163, pressure air is supplied from the pressure air supply source 164 to the mating faces of the spherical projection portion 157 and the spherical depression portion 158 through the valve 165, the pressure air passage 162 and the groove 161 to form a lubricant air layer.

The fixing means 155 is formed separate from the air supply means 154 and includes a mechanical lock 171 for fixing the mounting table 152 which has made a follow-up movement to the base 151. When the lock body 172 stored in the mounting table 152 of the mechanical lock 171 is moved down by a movable body 173 mounted on the base 151, it presses down the spherical projection portion 157, the spherical projection portion 157 expels pressure air forming an air layer from between the spherical projection portion 157 and the spherical depression portion 158 to be clamped to the spherical depression portion 158, and the mounting table 152 which has made a follow-up movement is fixed to the base 151 to keep its position. The lock body 172 is stored in a lock storage chamber 174. The lock storage chamber 174 is defined by the top face of the spherical projection portion 157 connected to the mounting table 152 and formed in the center portion of the spherical projection portion 157. The under face of the lock body 162 stored in the lock storage chamber 174 and the bottom of the lock storage chamber 174 are contacted to each other. The under face of the lock body 172 and the lock storage chamber 174 form a semi-spherical face smaller than the semi-spherical convex face of the spherical projection portion 157 and the semi-spherical concave face of the spherical depression portion 158 with the rotation center 159 of the bearing 153 as the center.

The lock body 172 comprises a receiving portion 176 and an insertion hole 177 at the center. The receiving portion 176 is semi-spherical and depressed inward from the top face of the lock body 172. The top face of the lock body 172 is located on one plane passing through the center of the semi-sphere of the receiving portion 176. The insertion hole 177 extends from the semi-spherical face of the receiving portion 176 to the semi-spherical face of the lock body 172. The spherical projection portion 157 has an escape hole 178 at the center. The escape hole 178 extends from the bottom of the lock storage chamber 174 to the semi-spherical face of the spherical projection portion 157. The movable body 173 has a rod 180 projecting downward straight from a spherical body 179. The rod 180 has a screw hole (threaded hole) formed from the under face to the inside thereof. When the mounting table 152 is not mounted on the spherical projection portion 157, the rod 180 of the movable body 173 is inserted into the insertion hole 177 and the escape hole 178 from the receiving portion 176 of the lock body 172 so that the spherical body 179 is rotatably fitted in the receiving portion 176. Thereafter, the mounting table 152 is connected to the spherical projection portion 157 by an unshown bolt to close the top of the lock storage chamber 174.

The fixing means 155 has an air operation unit 181 for clamping and unclamping the mechanical lock 171 with air. The air operation unit 181 comprises a clamp chamber 182 and an unclamp chamber 183. The clamp chamber 182 and the unclamp chamber 183 are formed in the center portion of the base 151 and are separated from each other by an annular diaphragm 184 and two disks 186 and 187 as partitions. More specifically, a depression is formed in the center portion of the base 151 from the under face, a screw hole having a larger diameter than the depression is formed in the under face of the base 151 in the depression, and a vertical hole 188 extending from the semi-spherical convex face of the spherical depression portion 158 to the top face of the depression is formed. The lower portion of the rod 180 of the movable body 173 projecting downward from the escape hole 178 of the spherical projection portion 157 is inserted into the depression through the vertical hole 188 from the top of the spherical depression portion 158, and a spring 189 such as a coil spring is inserted into the depression to surround the lower portion of the rod 180 from the bottom of the base 151, and the disk 186 is placed on the under face of the rod 180.

Thereafter, the diaphragm 184 is inserted into the depression from the bottom of the base 151, the inner peripheral portion of the diaphragm 184 is placed on the outer peripheral portion of the disk 186 placed on the rod 180, and the outer peripheral portion of the diaphragm 184 is placed on a stepped face 191 for connecting the screw hole to the depression. Thereafter, the disk 187 different from the above disk 186 is placed on the inner peripheral portion of the diaphragm 184 through the screw hole from the bottom of the base 151, a bolt 192 is fastened into the screw hole of the rod 180 through through holes formed in the center portions of the two disks 186 and 187 from below, and the inner peripheral portion of the diaphragm 184 is connected to the rod 180 by the two disks 186 and 187. When the two disks 186 and 187 are connected to the rod 180 by the bolt, the upper end portion of the spring 189 is contacted to the top face of the depression and the lower end portion of the spring 189 is contacted to the upper disk 186 to be compressed in a vertical direction so that the spring 189 gives spring force for clamping the mechanical lock 171 to the movable body 173. Further, a diaphragm support body 193 is fastened to the screw hole from the bottom of the base 151, and the outer peripheral portion of the diaphragm 184 is connected to the base 151 by the diaphragm support body 193 and the stepped face 191. Thereby, the clamp chamber 182 and the unclamp chamber 183 separated by the diaphragm 184 and the two disks 186 and 187 are formed in the base 151.

The base 151 comprises a clamp air passage 195 and an unclamp air passage 196 therein. The clamp air passage 195 extends from the clamp chamber 283 to the other side face of the base 151, and the unclamp chamber 196 extends from the unclamp chamber 183 to the other side face of the base 151. When the pressure air supply source 202 like an air compressor of a pressure air supply system 201 in the air operation unit 181 is activated and the passage switch valve 203 of the pressure air supply system 201 is opened to its clamp position from its passage closing position, pressure air is supplied into the clamp chamber 182 from the pressure air supply source 202 through the passage switch valve 203 and the clamp air passage 195 to press down the diaphragm 184, whereby the movable body 173 presses down the lock body 172 and the lock body 172 clamps the spherical projection portion 157 to the spherical depression portion 158. When this diaphragm 184 is pressed down by the pressure air of the clamp chamber 182, the air of the unclamp chamber 183 is discharged from the unclamp chamber 183 to the outside by an unshown leak valve. When the passage switch valve 203 is opened to its unclamp position from its passage closing position, pressure air is supplied into the unclamp chamber 183 from the pressure air supply source 202 through the passage switch valve 203 and the unclamp air passage 196 to press up the diaphragm 184, whereby pressing force applied to the lock body 172 from the movable body 173 is canceled and clamping of the spherical projection portion 157 to the spherical depression portion 158 by the lock body 172 is unclamped. When this diaphragm 184 is pressed up by the pressure air of the unclamp chamber 183, air in the clamp chamber 182 is discharged to the outside from the clamp chamber 182 by the unshown leak valve.

A case where a semiconductor device 138 is not mounted on the bonding work face 8 of the resonator 4 and a circuit substrate 139 is not mounted on the mounting table 152 when the mounting table 152 of the mounting unit 132 is caused to make a follow-up movement so that a portion for mounting the workpiece of the top face 154 of the mounting table 152 and the bonding work face 8 of the resonator 4 mounted to the ultrasonic bonding machine become parallel to each other as preparation work for bonding a plurality of workpieces by the ultrasonic bonding machine will be explained.

The passage switch valve 203 of the pressure air supply system 201 of the air operation unit 181 is first opened to its unclamp position from its passage closing position, and the mechanical lock 171 unclamps the spherical projection portion 157 from the spherical depression portion 158, whereby the spring 189 unclamps the mechanical lock 171, and pressure air is supplied from the pressure air supply system 162 into the mating faces of the spherical projection portion 157 and the spherical depression portion 158 to form a lubricant air layer. In the ultrasonic bonding machine, the transducer 6 stops its ultrasonic vibration, and pressure force of the pressure unit 133 is adjusted not to destroy the above lubricant air layer. In this state, the holder 3 is lowered along the straight line L2 by the pressure unit 133, whereby the bonding work face 8 of the resonator 4 is contacted to the top face 156 of the mounting table 152. Along with this, the mounting table 152 makes a follow-up movement in a suitable direction with respect to the base 151 by the bearing 153 so that the top face 156 becomes parallel to the bonding work face 8.

The downward movement of the above pressure unit 133 is stopped, the valve 165 of the pressure air supply system 163 is closed while that suspension state is maintained to stop supply of pressure air to the mating faces of the spherical projection portion 157 and the spherical depression portion 158 from the pressure air supply system 163, the passage switch valve 203 is opened to its clamp position from its unclamp position through the passage closing position, the mechanical lock 171 clamps the spherical projection portion 157 to the spherical depression portion 158, and the spring 189 clamps the mechanical lock 171. Thereby, the spherical projection portion 157 and the spherical depression portion 158 are contacted to each other, and the above mounting table 152 which has made a follow-up movement is fixed to the base 151, whereby the follow-up position in a suitable direction of the mounting table 152 with respect to the base 151 is maintained.

After the position of the mounting table 152 is maintained, the semiconductor device 138 is bonded to the circuit substrate 139 by the above-described ultrasonic bonding machine. In this case, while the top face 156 and the bonding work face 8 become parallel to each other with the above position of the mounting table 152, the circuit substrate 139 is positioned on the top face 156 to ensure the center of an area for attaching the semiconductor device 138 to the circuit substrate is aligned with the center of an intersection between the straight line L2 and the top face 156 of the mounting table 152 whereas the semiconductor device 138 is adsorbed to the bonding work face 8 to ensure that the center of an area for attaching the circuit substrate 139 to the semiconductor device 138 is aligned with the center of an intersection between the straight line L2 and bonding work face 8, whereby the electrodes 144 of the semiconductor device 138 and the electrodes 145 of the circuit substrate 139 are opposed to each other. Thereafter, the resonator 4 is lowered by the pressure unit 133, and the electrodes 144 and the electrodes 145 are wholly pressure contacted to each other to be bonded together with ultrasonic vibration by the resonator 4. As a result, bonding between the electrodes 144 and the electrodes 45 is carried out on the entire surfaces thereof ideally.

In this processing by ultrasonic bonding, as the mounting unit 132 has a structure that the mounting table 152 which has made a follow-up movement is fixed to the base 151 by the fixing means 155 including the mechanical lock 171 comprising at least the lock body 172 and the movable body 173, even when ultrasonic vibration is transmitted to the mounting table 152 from the resonator 4 as a bonding tool during processing, fixing support force between the mating faces of the spherical projection portion 157 and the spherical depression portion 158 dos not lower, the position of the mounting table 152 which has made a follow-up movement is suitably maintained, and the electrodes 144 and the electrodes 145 which are the overlapped portions of a plurality of workpieces are suitably bonded together. Since the mounting unit 132 is provided with the follow-up unit comprising the bearing 153, air supply means 154 and the fixing means 155, the follow-up unit does not exert a bad influence on the ultrasonic vibration of the resonator 4.

When the width in a horizontal direction of the mounting table 152 or the width in the horizontal direction of the spherical projection portion 157 is larger than the width in the horizontal direction of the spherical depression portion 158 in FIG. 9, the mounting table 152 or the spherical projection portion 157 can prevent foreign matter from falling on the spherical depression portion 158.

Figure 10:
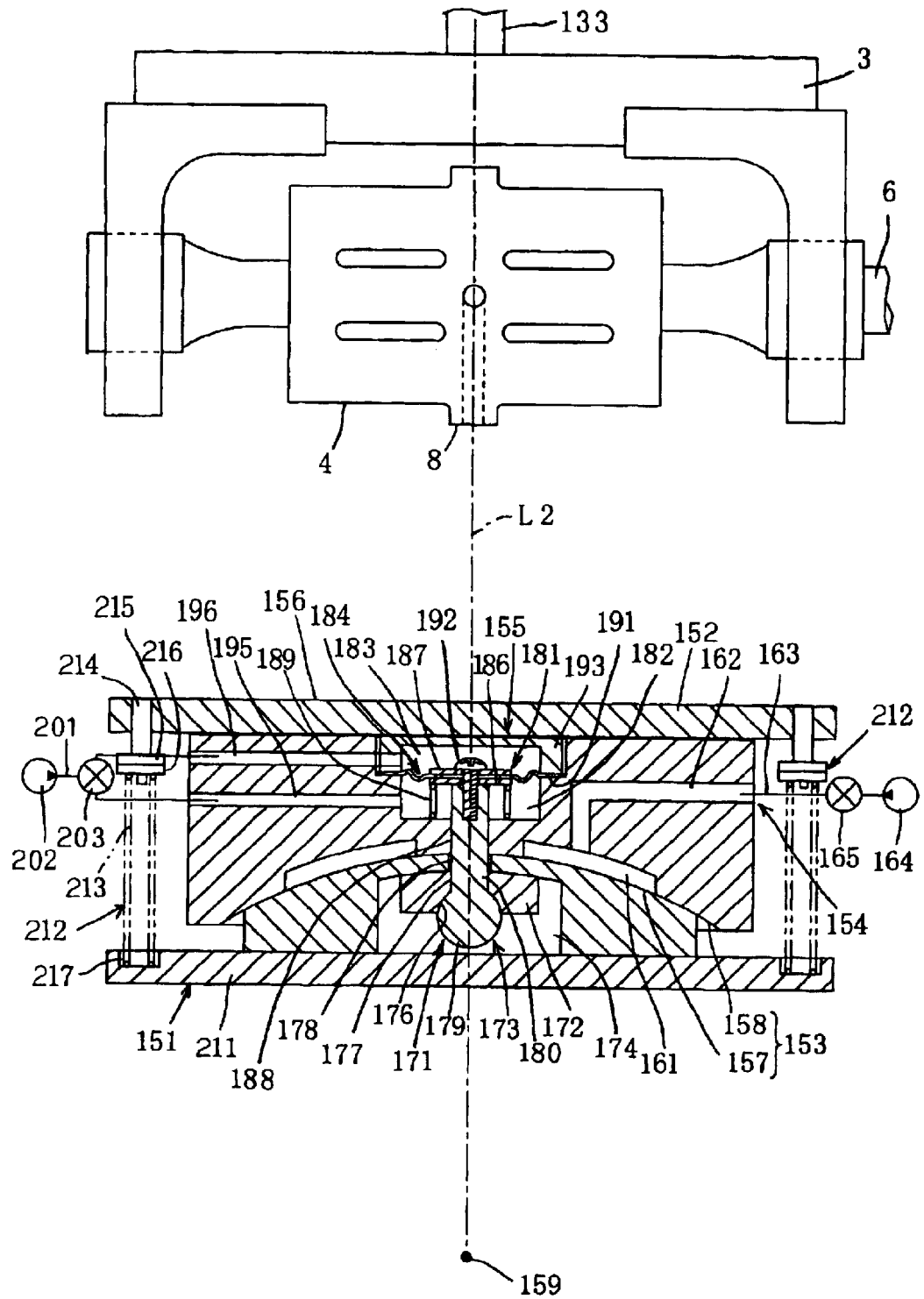
FIG. 10 is a sectional view of a canceling unit in Embodiment 4.

FIG. 10 is a sectional view of the mounting unit 132 according to Embodiment 4. In Embodiment 3, the spherical projection portion 157 is mounted on the mounting table 152, and the spherical depression portion 158 is mounted on the base 151. In Embodiment 4, the spherical projection portion 157 is mounted on the base 151, and the spherical depression portion 158 is mounted on the mounting table 152. Stated more specifically, as shown in FIG. 10, the lock storage chamber 174, lock body 172, receiving portion 176, insertion hole 177, escape hole 178 and spherical body 179 are arranged on the spherical projection 157 side. The air supply means 154 (groove 161 and pressure air passage 162) and fixing means 155 (mechanical lock 171, movable body 173, rod 180, air operation unit 181, clamp chamber 182, unclamp chamber 183, diaphragm 184, disks 186 and 187, vertical hole 188, spring 189, diaphragm support body 193, stepped face 191, clamp air passage 195, unclamp air passage 196) are arranged on the spherical depression portion 158 side. The pressure air supply system 163 (pressure air supply source 164, valve 165) and pressure air supply system 201 (pressure air supply source 202, passage switch valve 203) are provided outside the spherical projection portion 157 and the spherical depression portion 158 like the ultrasonic bonding machine shown in FIG. 8.

The base 151 is composed of the spherical projection portion 157 including the lock storage chamber 174, the lock body 172, spherical body 179 and escape hole 178, and the base body 211, and a cancel unit 212 for shouldering the total weight of pipings and wires provided in the spherical depression portion 158 to prevent the application of the weight to the spherical projection portion 157 from the spherical depression portion 158 is added unlike the ultrasonic bonding machine shown in FIG. 8. After the lock body 172 and the spherical body 179 are installed in the lock storage chamber 174, the spherical projection portion 157 and the base body 211 are connected to each other by an unshown bolt.

In FIG. 10, the cancel unit 212 comprises a spring 213 such as a coil spring, screw rod 214, lock nut 215, control nut 216 and spring receiving depression portion 217. The screw rod 214 is screwed into a projection portion projecting sideway from the spherical depression portion 158 of the mounting table 152 to be fixed unrotatably. The screw rod 214 projecting downward from the projection portion of the mounting table 152 is away from the spherical depression portion 158, the spherical projection portion 157 and the base body 211, and the lock nut 215 and the control nut 216 are rotatably fitted onto the lower portion of the screw rod 215. The upper end of the spring 213 is inserted to surround the lower end of the screw rod 214 projecting downward from the control nut 216 to be contacted to the under face of the control nut 216, and the lower end of the spring 213 is stored in the spring receiving depression portion 217 formed in a projecting portion projecting sideways from the spherical projection portion 157 to be contacted to the bottom of the spring receiving depression portion 217.

While the lock nut 215 is moved up on the screw rod 214 and separated from the control nut 216, the distance between the control nut 216 and the base body 211 is changed by turning the control nut 216, thereby contracting or expanding the spring 213 by the control nut 216 so that the total weight of pipings and wirings is shouldered by the cancel unit and not applied to the spherical projection portion 157 from the spherical depression portion 158. After thus adjusted, while the control nut 216 is held not to be turned round the screw rod 214, the lock nut 215 is moved toward the control nut 216 and locked to the control nut 216, thereby maintaining the spring force of the above adjusted spring 213. Thereby, the above cancel unit 212 shoulders the total weight of pipings and wirings suitably.

The cancel unit 212 in FIG. 10 may be composed of pressure air or rubber instead of mechanical elements such as the spring 213, screw rod 214, lock nut 215, control nut 216 and spring receiving depression portion 217. When the cancel unit 212 is composed of mechanical elements as shown in FIG. 10, it can shoulder the total weight of pipings and wirings after adjustment for a long time.

In FIG. 10, when the fixing means 155 and the air supply means 154 for the spherical projection portion 157 and the spherical depression portion 158 are inverted, the cancel unit 212 can be omitted. In this case, the lock storage chamber 174, lock body 172, receiving portion 176, insertion hole 177, escape hole 178 and spherical body 179 are arranged on the spherical depression portion 158 side. The air supply means 154 (groove 161, pressure air passage 162) and fixing means 155 (mechanical lock 171, movable body 173, rod 180, air operation unit 181, clamp chamber 182, unclamp chamber 183, diaphragm 184, disks 186 and 187, vertical hole 188, spring 189, diaphragm support body 193, stepped face 191, clamp air passage 195, unclamp air passage 196) are arranged on the spherical projection portion 157 side.

Figure 11:
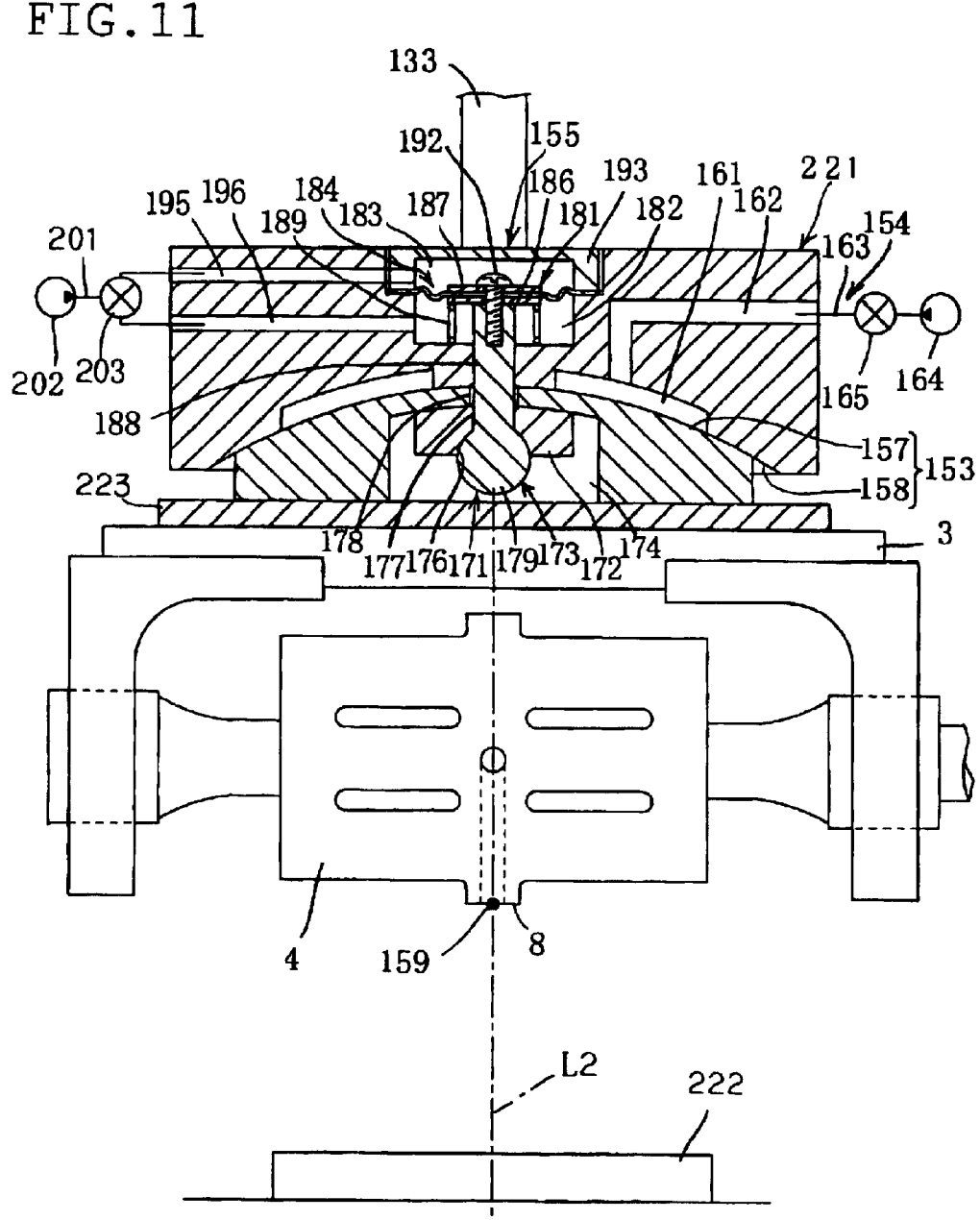
FIG. 11 is a sectional view of a follow-up unit provided in a resonator mounting portion in Embodiment 5.

FIG. 11 is a sectional view of the follow-up unit 221 provided in a portion for mounting the resonator 4 to the pressure unit 133 according to Embodiment 5. The follow-up unit 221 shown in FIG. 11 may have a structure similar to the mounting unit 132 shown in FIG. 8 or to the mounting unit 132 devoid of the cancel unit 212 shown in FIG. 10. In this embodiment, it has a structure similar to the mounting unit 132 shown in FIG. 10. The follow-up unit 221 is interposed between the output end of the pressure unit 133 and the holder 3. Stated more specifically, the output end of the pressure unit 133 and the center portion of the diaphragm support body 193 of the follow-up unit 221 are connected to each other, and the top face of the holder 3 and the attachment body 223 corresponding to the base body 211 shown in FIG. 10 of the follow-up unit 221 are connected to each other. When the resonator 4 is connected to the output end of the pressure unit 133 by the follow-up unit 221 and the holder 3, the spherical body 179 of the movable body 173 is received by the receiving portion 176 of the lock body 172 in the follow-up unit 221, thereby maintaining connection between the pressure unit 133 and the resonator 4 suitably.

The mounting table 222 shown in FIG. 11 corresponds to the mounting unit 132 shown in FIG. 9, does not have a follow-up function and has a top face corresponding to the top face 156 shown in FIG. 8.

In the above embodiments, the bonding work face 8 is used to bond metals which vibrate in a horizontal direction shown by the arrow X in FIG. 9 which is the direction of rubbing the overlapped portions of a plurality of workpieces. The present invention can be applied to an ultrasonic bonding machine in which the bonding work face 8 is used to bond resins which vibrate in a direction (longitudinal direction perpendicular to the above X direction) of pressing the overlapped portions of a plurality of workpieces.

Figure 12:
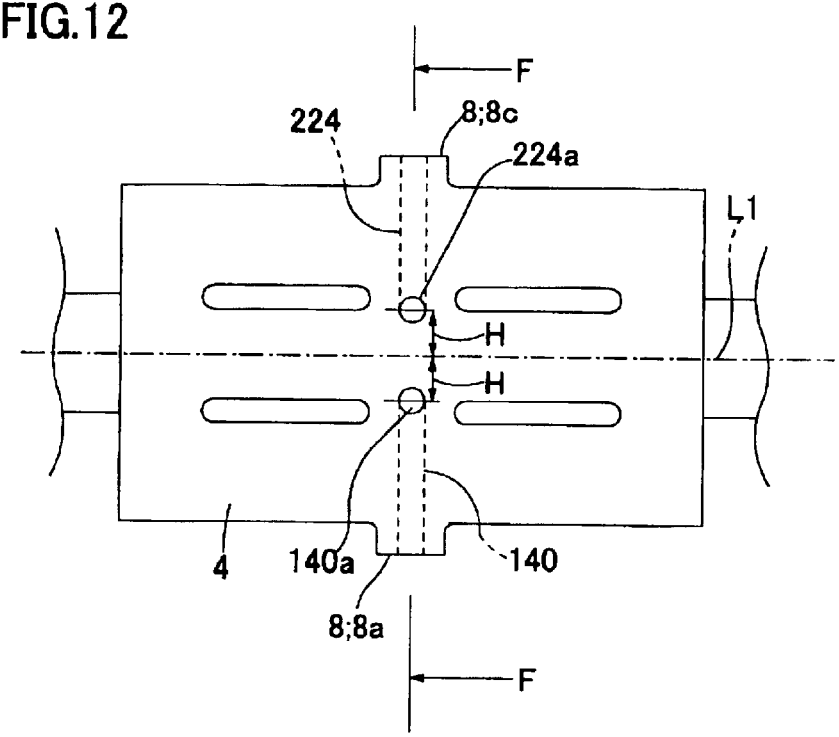
FIG. 12 is a front view of a resonator in Embodiment 6.
Figure 13:
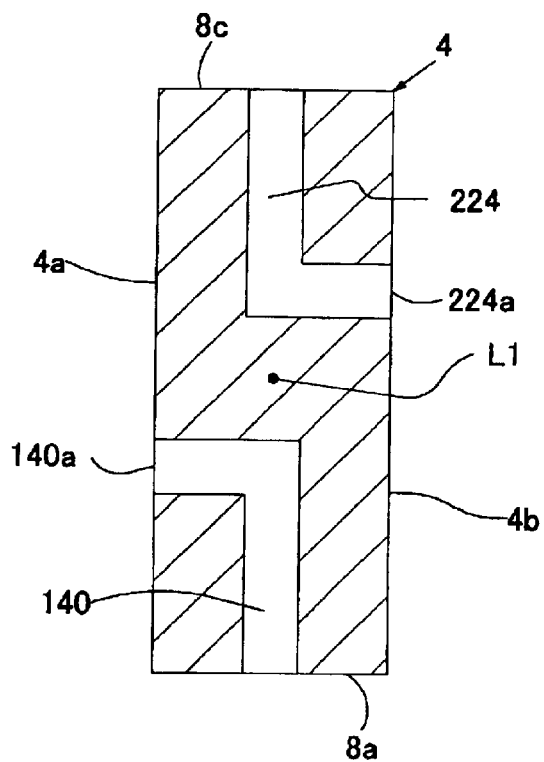
FIG. 13 is a longitudinal sectional view of the resonator in Embodiment 6.

FIG. 12 and FIG. 13 show Embodiment 6 in which the resonator 4 shown in FIG. 8 is used with the rotation support units 5 and the angle indexing unit 12 shown in FIG. 1. FIG. 12 is a front view of the resonator 4. FIG. 13 is a longitudinal sectional view cut on line F—F of the resonator 4 shown in FIG. 12. As shown in FIG. 12 and FIG. 13, the bonding work face 8 of the resonator 4 is provided on the top and under faces of the resonator 4. The bonding work face formed on the under face of the resonator 4 is represented by 8a, and the bonding work face formed on the top face of the resonator 4 is represented by 8c. The resonator 4 has a suction passage 140 extending from the bonding work face 8a to the front face 4a which is one of the outer faces of the resonator 4, and a suction passage 224 extending from the bonding work face 8c to the rear face 4b which is one of the outer faces of the resonator 4. The suction passage 140 and the suction passage 224 are formed separately. The hole 140a of the suction passage 140 extending to the front face 4a of the resonator 4 and the hole 224a of the suction passage 224 extending to the rear face 4b of the resonator 4 are away from the center line L1 extending in the vibration transmission direction of the resonator 4 by the same interval H in the vertical direction. Therefore, the resonator 4 is supported to the holder 3 by the rotation support units 5 and the angle indexing unit 12 shown in FIG. 1 and turned at 180° with the center line L1 as the center of rotation, the bonding work face 8a is replaced by the bonding work face 8c, and the bonding work face 8c is used to bond a plurality of workpieces. Since the height of the hole 224a becomes the same as the height of the hole 140a on the front face 4a side in this case, it is easy to change the connection of the suction system 141 from the suction passage 140 to the suction passage 224.

The mounting unit 132 shown in FIG. 8 may be used as the mounting table 7 shown in FIG. 5, and the follow-up unit 221 shown in FIG. 11 may be used as the holder 3 shown in FIG. 1.

What is claimed is:

1. An ultrasonic bonding machine for bonding together the overlapped portions of a plurality of workpieces with ultrasonic vibration transmitted from a resonator by sandwiching the overlapped portions between the resonator mounted to a holder connected to a pressure unit and a mounting unit, wherein the holder comprises a rotation support unit for mounting the resonator having a plurality of bonding work faces in such a manner that it can turn with an axis in a vibration transmission direction as the center of rotation, and an angle indexing unit for fixing the resonator at an indexing angle in a circumferential direction with the axis in the vibration transmission direction of the plurality of bonding work faces as the center.

2. The ultrasonic bonding machine according to claim 1, wherein the angle indexing unit comprises an angle indexing body mounted to the holder in such a manner that it can move in a direction perpendicular to the axis in the vibration transmission direction, stoppers attached to the angle indexing body, and stopper portions formed in the rotation support unit and mated with the stoppers at an indexing angle of the plurality of bonding work faces.

3. The ultrasonic bonding machine according to claim 2, wherein the angle indexing unit comprises an operation body rotatably mounted to the holder, a cam fixed to the operation body and a guide for slidably mating the angle indexing body with the holder.

4. The ultrasonic bonding machine according to claim 1, wherein the angle indexing unit comprises a step motor mounted to the holder and a train of gears for transmitting the revolution of the step motor to the rotation support unit.

5. The ultrasonic bonding machine according to claim 4, wherein the train of gears consists of a small-diameter gear connected to the step motor and a large-diameter gear connected to the rotation support unit.

6. An ultrasonic bonding machine for bonding together overlapped portions of a plurality of workpieces with ultrasonic vibration transmitted from a resonator by sandwiching the overlapped portions between the resonator connected to a pressure unit and a mounting unit, wherein the mounting unit comprises a base, a mounting table, a bearing, composed of a spherical projection portion and a spherical depression portion, for mounting the mounting table to the base in such a manner that the mounting table can make a follow-up movement, air supply means for forming a lubricant air layer between the mating faces of the spherical projection portion and the spherical depression portion, and fixing means including a mechanical lock for fixing the mounting table which has made a follow-up movement to the base as a separate unit from the air supply means.

7. An ultrasonic bonding machine for bonding together overlapped portions of a plurality of workpieces with ultrasonic vibration transmitted from a resonator by sandwiching the overlapped portions between the resonator connected to a pressure unit and a mounting unit, wherein a follow-up unit is provided in a portion for mounting the resonator to the pressure unit, and the follow-up unit comprises a bearing, composed of a spherical projection portion and a spherical depression portion, for mounting the resonator to the mounting table in such a manner that the mounting table can make a follow-up movement, air supply means for forming a lubricant air layer between the mating faces of the spherical projection portion and the spherical depression portion, and fixing means including a mechanical lock for fixing the mounting table which has made a follow-up movement to the base as a separate unit from the air supply means.

8. The ultrasonic bonding machine according to claim 6 or 7, wherein the fixing means comprises an air operation unit for enabling the mechanical lock to carry out clamping or unclamping operation with air.

9. The ultrasonic bonding machine according to claim 6 or 7, wherein the fixing means comprises a spring for enabling the mechanical lock to carry out clamping operation.

* * * * *